Nov. 6, 1956  H. M. GEYER  2,769,430
ACTUATOR WITH DUAL LOCKING MEANS
Filed Aug. 31, 1953  3 Sheets-Sheet 1

INVENTOR.
Howard M. Geyer
Craig V. Morton
Attorney

Nov. 6, 1956  H. M. GEYER  2,769,430
ACTUATOR WITH DUAL LOCKING MEANS
Filed Aug. 31, 1953  3 Sheets-Sheet 3

INVENTOR.
Howard M. Geyer
BY
Craig V. Morrow
Attorney

United States Patent Office 2,769,430
Patented Nov. 6, 1956

2,769,430

ACTUATOR WITH DUAL LOCKING MEANS

Howard M. Geyer, Dayton, Ohio, assignor to General Motors Corporation, Detroit, Mich., a corporation of Delaware Application August 31, 1953, Serial No. 377,534

20 Claims. (Cl. 121—40)

The present invention pertains to actuators, and particularly to self-locking actuators adapted for utilization in aircraft.

Self-locking actuators have become very popular for effecting movement of various aircraft control surfaces and accessories. The self-locking feature assures the pilot that once a control surface has been moved to a predetermined position, that position will be maintained. In addition, safety considerations dictate the necessity, or at least the desirability, of providing two independent motivating means for operating an actuator. The instant actuator employs fluid under pressure as the primary motivating means and electromotive force as the secondary, or auxiliary, motivating means. The locking means preferably are the positive, interengaging type, such as a dog tooth brake, since only positively interengaging members will prevent slippage under the sustained vibration inherent in aircraft. However, dog toothed brakes are not instantaneously engageable, a requisite in actuators employed for precision adjustment of aircraft control surfaces. That is, when the desired movement has been accomplished, a period of time elapses, and the additional movement ensues until the toothed members become positively engaged. Conversely, a friction type brake is instantaneously operable, but tends to creep or slip when subjected to sustained vibration. This invention employs the desirable characteristics of both types of brakes, namely, instantaneous locking and positive locking, by using a pair of serially arranged brakes, one of the toothed type, and the other of the friction type. Accordingly, among my objects are the provision of an actuator having dual locking means; the further provision of a fluid pressure operated actuator having dual locking means; and the still further provision of a self-locking actuator of the aforesaid type having primary and secondary motivating means.

The aforementioned and other objects are accomplished in the present invention by employing a planetary gear set having serially arranged friction and toothed type brakes associated with the reaction member, or ring gear, thereof. Specifically, the actuator includes a cylinder having a piston mounted therein for linear movement in either direction. The piston includes a rod that projects through an end wall of the cylinder, the rod precluding rotation of the piston and being adapted for connection to either a relatively fixed support, or a relatively movable load device. The opposite end wall of the cylinder is, likewise, adapted for connection to either the support or the load device, such that upon relative movement between the cylinder and piston, the load device will be positioned. A screw shaft is rotatably journaled within the cylinder, the screw shaft constituting a component of the well known ball-screw and nut assembly, the nut of which is attached to the piston and constrained to move lineally therewith. The screw shaft threadedly engages the nut through an agency of a plurality of circulating balls, such that rotation will occur between the nut and screw shaft upon linear movement of the piston.

In the disclosed embodiment, the nut is formed as an integral part of the piston, but it is to be understood that other forms may be readily adopted and the specific actuator construction herein disclosed is only exemplary. In order to accomplish the objective of locking the piston, and, hence, a load device operatively connected thereto, in a fixed position when the motivating means are inactive, the rotatable screw shaft is operatively connected to the planet carrier, or spider, of the aforementioned planetary gear set. The planet carrier, in a conventional manner, supports a plurality of stub shafts about which the planet gears are journaled for rotation. The sun gear of the planetary gear set is normally restrained against rotation by the inactive auxiliary motivating means which are operatively connected thereto. The ring gear, or reaction member, is operatively connected to a brake drum having axially spaced serrated or toothed, and smooth, surface portions. A toothed, or serrated brake band, is disposed in contiguous relation to the toothed portion, and a friction brake band is disposed in contiguous relation to the smooth portion. The brake bands are constructed and arranged to normally contract and, thus, engage their complementary brake drum surface portions. A pair of independent, fluid pressure operated lock release pistons are employed to expand the brake bands to facilitate their disengagement from the brake drum when movement of the actuator piston is called for.

A typical actuator control system is also comprehended by this invention. The control system comprehends a source of fluid pressure having pressure supply conduit and a drain conduit. The supply conduit is connected at all times with the fluid pressure operated piston for releasing the dog toothed brake, and with the inlet port of a four-way manually operable selector valve, the position of which determines whether the actuator will be extended, retracted, or locked in position. The selector valve has a pair of outlet ports connected to the actuator cylinder and a pair of drain ports connected to the drain line. A shuttle valve, having connection with the fluid pressure operated piston for releasing the friction brake, is connected between the conduits leading from the outlet ports of the valve to the actuator cylinder. At all times, when the requisite predetermined pressure potential exists in the supply conduit, the dog toothed brake is released. When the selector valve is in the neutral position, wherein both outlet ports are closed, the actuator piston is restrained against movement by the engaged friction brake. Upon movement of the selector valve to a position where either outlet port is connected to the inlet port, the friction brake is released concurrently with the application of pressure fluid to either actuator chamber, thereby freeing the screw shaft for rotation and permitting reciprocal piston movement.

If for any reason the fluid pressure system should become inoperative, or the pressure potential in the supply conduit should decrease to a potential sufficient to release the dog to the brake, the actuator piston and load device associated therewith may be adjusted by operation of the auxiliary motivating means constituted by a reversible electric motor. When the fluid pressure system fails, both the dog and friction brakes, constituted in the locking means, positively restrain rotation of the ring gear. Upon energization of the electric motor and with the locking means engaged, or effective, the sun gear and, hence, the planet carrier and screw shaft may be rotated in either direction. In this manner relative rotation will ensue between the nut and screw shaft, thereby effecting linear movement of the nut and piston as a unit, relative to the cylinder, providing the actuator chamber flow ports are connected to drain or a minimum back pressure supply system.

Further objects and advantages of the present invention will be apparent from the following description, reference being had to the accompanying drawings wherein preferred embodiments of the present invention are clearly shown.

Figure 1:
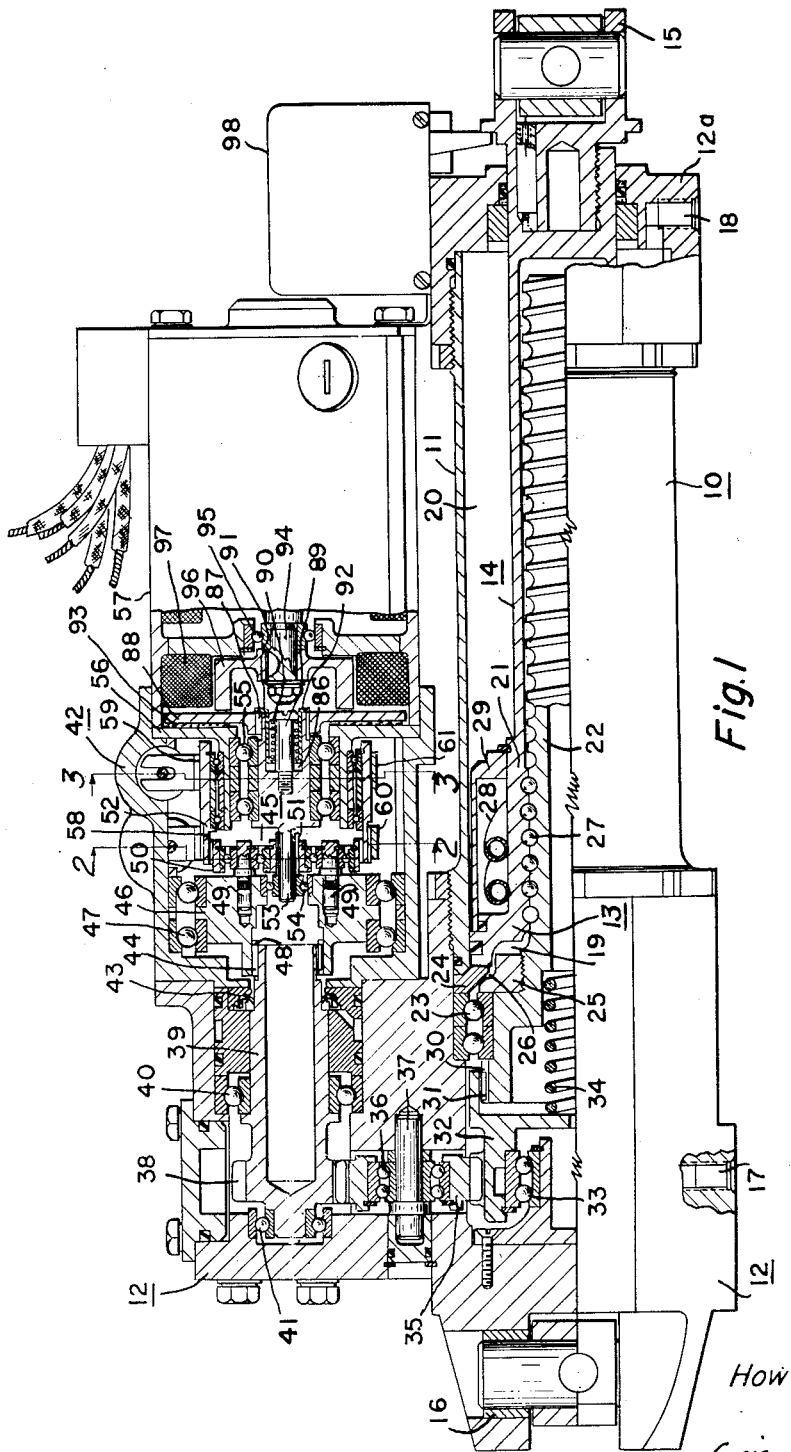
Fig. 1 is a longitudinal view, partly in section and partly in elevation, of a dual drive actuator with dual locking means constructed according to this invention.

With particular reference to Fig. 1, the actuator includes a cylinder 10 comprising a tubular portion 11 having attached thereto at its ends cap members 12 and 12a. The cap members 12 and 12a threadedly engage a tubular portion 11 and suitable fluid sealing means are provided between contiguous surfaces thereof. A piston 13 sealingly engages the interior of a tubular portion 11 and is adapted for linear movement relative thereto in either direction.

The piston 13 includes an integral, hollow, longitudinally extending rod portion 14, which projects through an opening in the end cap member 12a, and has attached to the projecting end a clevis 15, which may be attached to either a relatively fixed support, or a relatively movable load device. The other end cap member 12 also carries a clevis 16, which may be attached to either the fixed support or the movable load device such that upon linear movement of the piston and rod within the cylinder, the position of the load device will be altered. By reason of the piston rod 14 being constructed and arranged for connection to either a load device, or a fixed support through the clevis 15, rotation of the piston 13 within the cylinder 10 is precluded. End cap member 12 further includes a port opening 17 through which fluid may flow to and from the cylinder 10, on one side of the piston, in a manner to be hereinafter described, and the end cap member 12a is formed with a port opening 18 through which fluid may flow to and from the cylinder 10 on the opposite side of the piston 13.

The piston 13 divides the cylinder 10 into an extend chamber 19 and a retract chamber 20. The instant actuator employs the well known ball-screw and nut arrangement, the nut 21 of which is formed as an integral portion of the rod 14. The nut 21 is formed with a spiral groove, which may be of semi-circular configuration, as is shown in Fig. 1. A screw shaft 22 is rotatably journaled within the end cap 12 by bearing means 23. The outer races of the bearing means 23 are retained between an integral internal shoulder of the cap member 12 and a retainer ring 24 positioned between one end of tubular member 11 and the outer bearing races. The inner races of the bearing 23 are retained between an integral shoulder formed adjacent the end of the screw shaft 22 and a retaining ring 25 threadedly engaging a portion of the screw shaft. An annular channel 26 is provided between the retaining rings 24 and 25 to permit the flow of fluid to and from the extend actuator chamber 19 through the port 17. The screw shaft 22 is also formed with a spirally threaded portion, which, in this instance, is semi-circular in cross section to facilitate the reception of a plurality of balls 27, which operatively interconnect the screw shaft 22 and the nut 21. A plurality of passages 28 are provided by the nut 21 to facilitate the circulation of the balls 27 upon relative rotation between the screw shaft 22 and the nut. The circulating passages 28 are, in turn, enclosed by a cover member 29. The free end of the screw shaft 22, as is shown in Fig. 1, projects into the hollow portion of piston rod 14.

The end of the screw shaft 22 adjacent the bearing support therefor is formed with a plurality of longitudinal serrations, or splines, 30, which engage complimentary splines 31 formed on the flange of a gear wheel 32 rotatably supported by a bearing means 33 within the end cap 12. The straight splined connection between the gear wheel 32 and the screw shaft 22 precludes relative rotation therebetween, but permits relative longitudinal movement therebetween sufficient to take up the slack clearances. The screw shaft 22 is urged towards end cap member 12a by a spring 34 having ends seating against the gear 32 and the screw shaft.

The gear 32 meshes with a gear 35 rotatably supported by bearing means 36, which are carried by a stationary stub shaft 37 fixedly retained in the end cap 12. The gear 35, in turn, meshes with a gear 38 formed with an integral longitudinal extending hollow shaft 39. The gear 38 and its shaft 39 are rotatably journaled within end cap member 12 by bearing means 40 and 41. The end cap 12 has attached thereto a brake housing 42 into which the longitudinally extending shaft 39 extends. Suitable sealing means 43 circumscribe the shaft 39 to preclude the flow of fluid from end cap member 12 into the brake housing 42.

The end of the shaft 39, which projects into the brake housing 42 is formed with a straight splined portion 44. A planetary gear set indicated generally by the numeral 45, is mounted within the brake housing 42. The planet carrier, or spider, 46 of this planetary gear set is rotatably journaled by bearing means 47 within the housing 42 and includes an annular flange portion having straight splines 48 which engage the straight splines 44 formed on the end of shaft 39. In a conventional manner, the planet carrier 46 carries a plurality of stub shafts 49 about which a plurality of planet gears 50 are journaled for rotation. The planet gears 50, in turn, mesh with a sun gear 51 and a ring gear, or reaction member, 52. The sun gear 51 is carried by a shaft 53, the ends of which are journaled by bearing means 54 carried by the planet carrier 46, and bearing means 55 carried by the end cap 56 of an electric motor housing 57 suitably attached to the brake housing 42. The reaction member 52 of the planetary gear set constitutes a brake drum having a longitudinally serrated surface portion 58 and a smooth surface portion 59. A complementary serrated brake band 60 circumscribes the serrated surface portion 58 of the ring gear 52, and a friction brake band 61 circumscribes the smooth surface portion 59 of the ring gear.

Figure 3:
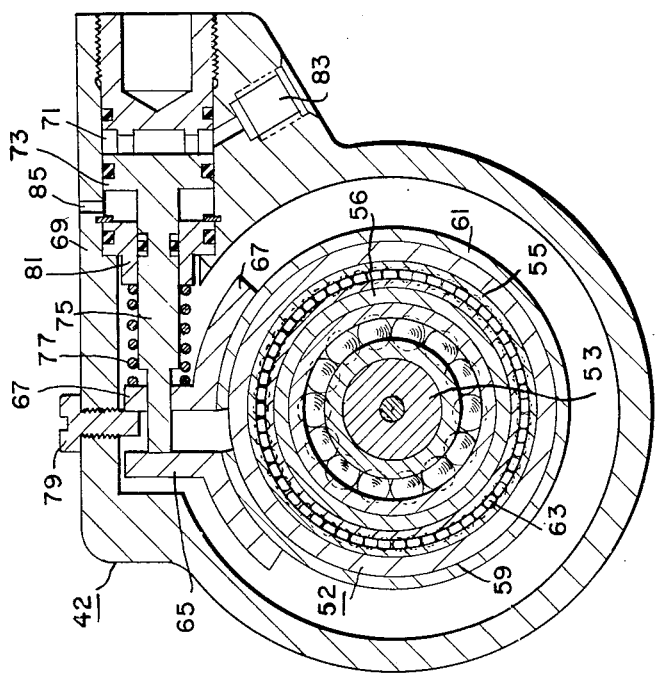
Fig. 3 is an enlarged sectional view taken along line 3—3 of Fig. 1.
Figure 2:
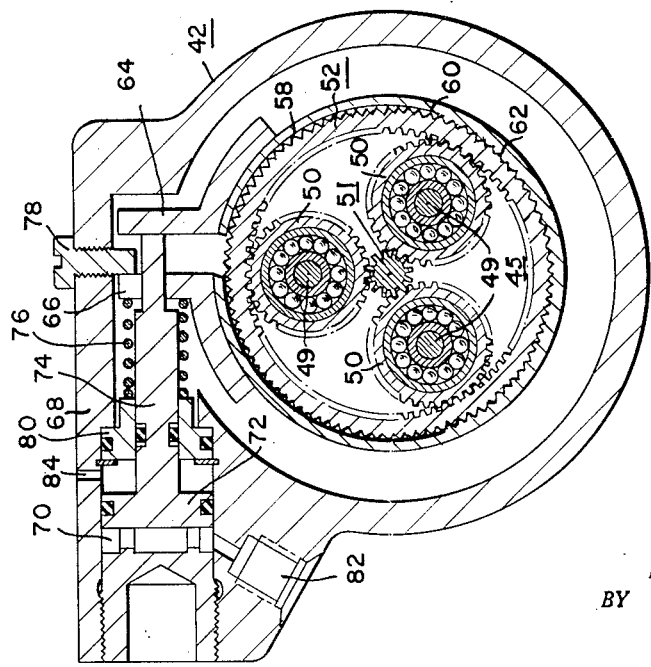
Fig. 2 is an enlarged sectional view taken along line 2—2 of Fig. 1.

With particular reference to Figs. 2 and 3, the dual locking means of the instant actuator will next be described in greater detail. As heretofore alluded to, it has been discovered that due to sustained vibration inherent in aircraft, friction brakes will slip. However, it is well known that positive interengaging brakes, such as those of the dog tooth, or serrated, type will not slip under sustained aircraft vibration. However, positive interengaging brakes have a disadvantage inasmuch as they are not instantaneously engageable. That is, upon actuation of a toothed type brake, relative movement occurs between the brake members until the teeth thereof become firmly engaged. However, in friction brakes, this phenomenon is not true. That is, when a friction brake is applied, movement is substantially instantaneously stopped. Accordingly, the instant actuator combines a toothed type brake and a friction brake arranged in tandem whereby the desirable characteristics of each type of brake may be successfully employed, while the disadvantages of each type of brake may be obviated.

As is shown in Fig. 2 of the drawings, the brake housing 42 encloses the ring gear, or reaction member, 52 having a longitudinally serrated portion 58. This portion of the ring gear 52 is circumscribed by a brake band 60 having a complementary serrated portion 62. Opposed ends of the brake band 60 have attached thereto upright members 64 and 66, the brake band being prestressed so as to normally contract and positively engage the serrated portion 58 of the ring gear 52. The brake housing 42 is formed with an enlarged portion 68, within which is formed a servo chamber 70. A reciprocal piston 72 is disposed within the servo chamber 70, the piston 72 having a longitudinally extending rod 74, the end of which operatively engages upright member 64 attached to the brake shoe 60. A spring 76 continually urges upright member 66 against a fixed stop 78, one end of the spring 76 seating against the member 66 and the other end of the spring seating against a plug 80 forming one end wall of the servo chamber 70. The inherent resiliency of the brake band 60, or its tendency to contract around the ring gear 52, urges the piston 72 to the left, as viewed in Fig. 2. In order to effect movement of the piston 72 to the right, as viewed in Fig. 2, and thereby expand the brake band 60 to release the toothed type brake, a port 82 is formed within the housing 42, the port having connection with the servo chamber 70. The servo chamber 70 also includes a port 84 through which any fluid seeping past the piston seals may flow to drain. When fluid under pressure is admitted through port 82 to the servo chamber 70, the piston 72 moves to the right, as viewed in Fig. 2, thereby expanding the brake drum 60 by reason of the piston rod 74 moving the upright member 64.

With reference to Fig. 3, the friction brake mechanism will next be described. As is seen in Fig. 3, the housing 42 includes a second projecting portion 69. The brake band 61, which circumscribes the smooth portion 59 of the ring gear 52, carries a friction surface. The ring gear 52 is rotatably supported by bearing means 63, which are carried by the end plate 56 of the electric motor housing 57. In a like manner, opposed ends of the brake band 61 have attached thereto upright members 65 and 67. The portion 69 of the housing 42 forms a servo chamber 71 within which a piston 73 having an integral longitudinally extending rod portion 75 is disposed. The brake band 61 is again prestressed so that it normally contracts to frictionally engage the ring gear 52 and, thus, a spring 77 retains upright member 67 in abutting relation with respect to a stop 79. Opposite ends of the spring 77 seat against the upright member 67 and a plug 81 forming an end wall of a servo chamber 71. The housing 42 is also formed with a port opening 83, which has communication with servo chamber 71, the servo chamber 71 having a drain port 85 through which any fluid seeping past the piston seals may flow to drain. In order to release the friction brake, fluid under pressure must be admitted to the servo chamber 71 through the port 83 so as to urge the piston 73 to the left, as viewed in Fig. 3, thereby causing the piston rod 75 to expand the brake band 61 by reason of its engagement with upright member 65.

Referring again to Fig. 1, the sun gear shaft 53 is formed with a recess 86, and a straight splined portion 87. A disc 88 composed of a magnetic material has a complementary straight splined portion engaging the straight splines of the sun gear shaft 53. By reason of the straight spline connection between disc 88 and the sun gear shaft 53, relative rotation between the shaft and disc is precluded, but relative axial movement between the shaft and disc is permitted. A bolt 89, threadedly engaging an opening in the shaft 53, is disposed within the recess 86. The bolt 89 forms a guide for a spring 90, which normally urges a cap member 91 to the left, as viewed in Fig. 1. The cap member includes a flanged portion 92, which overlaps the magnetic disc 88 and normally urges the magnetic disc to the left, as viewed in the drawing.

The stationary end cap 56 of the motor housing 57 carries a stationary friction surface 93, the construction and arrangement being such that when the electric motor disposed within housing 57 is deenergized, the disc 88 will be urged into frictional engagement with the friction surface 93, by the spring 90, thus, preventing rotation of the disc 93 and the sun gear 51.

The magnetic disc 88 forms a component part of a magnetic clutch to be described. A reversible electric motor is disposed within housing 57, the shaft 94 of which is supported by bearing means 95 and carries a cup-shaped element 96. The construction of the motor and electromagnetic clutch assembly is more particularly disclosed in my Patent No. 2,620,683. Suffice it here to say that the cup-shaped element 96 is rotatable within a magnetic field established by an electromagnet 97. When the electric motor within housing 57 is deenergized by any suitable switch means, not shown, the electromagnet 97 is likewise deenergized and the spring 90 will urge the magnetic disc 88 away from the cup-shaped member 96 and into frictional engagement with the braking surface 93. Thus, when the motor is deenergized, sun gear shaft 53 is restrained against any rotative movement. As the locking means, constituted by the dual brake construction heretofore described, control the rotation of the reaction gear 52 of the planetary gear set, it is apparent that the locking means are rendered operative when the auxiliary motivating means, the electric motor, is inactive. That is, rotation of the planet carrier 46 and the screw shaft 22 is permitted when either the ring gear 52, or the sun gear 53, is free to rotate. Thus, if the sun gear is free to rotate, restraining rotation of the ring gear will not lock the actuator piston 13 against movement. Conversely, if the ring gear is free to rotate, restraining rotation of the sun gear will not preclude reciprocal movement of the actuator piston 13.

In the instant actuator, utilization of the electric motor to effect piston reciprocation through rotation of the screw shaft 22 is only comprehended upon a failure of the fluid pressure system. That is, fluid under pressure is considered the primary motivating means for the actuator. However, the actuator can be operated by the auxiliary motivating means even though the fluid pressure system in operative in a manner which will be described hereinafter. Suffice it here to say that when an electric motor is energized, the electromagnet 97 is concurrently energized and the magnetic field created by the electromagnet will attract the magnetic disc 88 so that the disc 88 will move into engagement with the cup-shaped member 96, which is then being rotated by the electric motor shaft 94. Rotation of the disc 88 by the cup-shaped member 96 will be imparted to the shaft 53 and sun gear 51 and, thence, to the planet carrier 46 to the shaft 39 and the screw shaft 22 through the gear train comprising gears 38, 35, and 32.

A limit switch arrangement is included for controlling the energization of the electric motor to insure that the electric motor will be deenergized when the actuator piston reaches the ends of its strokes within the cylinder 10. The limit switch arrangement is enclosed within a casing 98 attached to the motor housing 57. The particular construction and arrangement of the limit switches and the actuating means therefor form no part of the present invention, and the switches may be controlled in a manner similar to that disclosed in my Patent 2,620,683.

Figure 4:
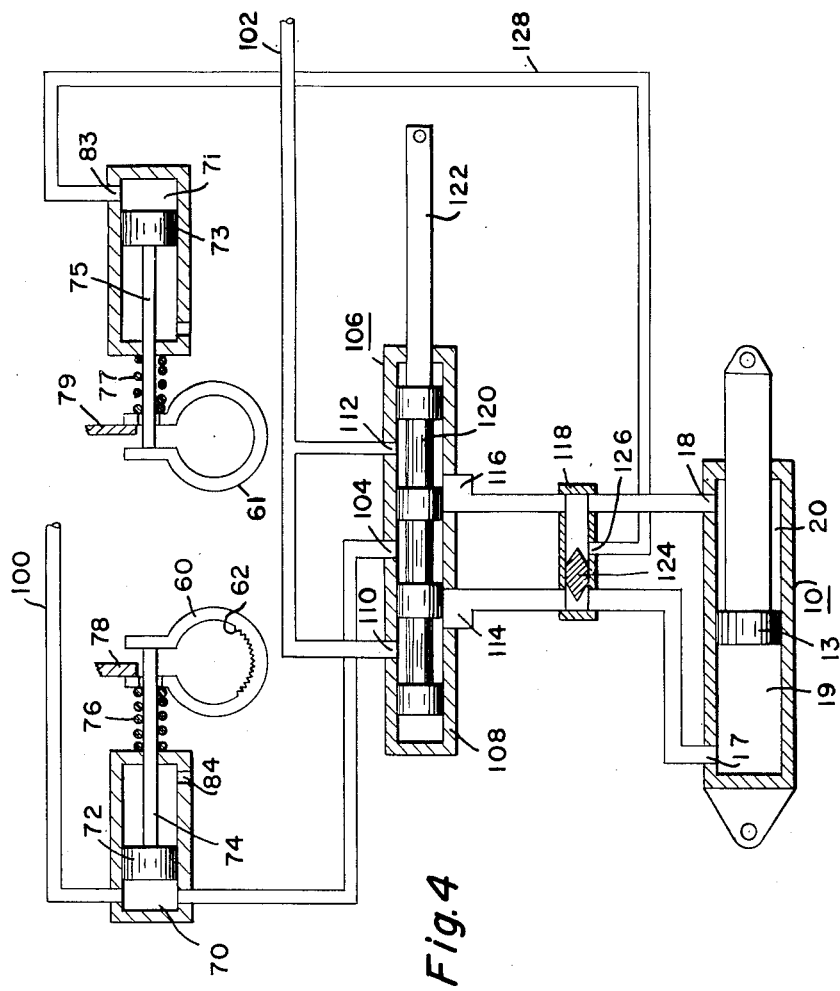
Fig. 4 is a schematic view of a typical control system for effecting fluid pressure operation of the instant actuator.

With reference to Fig. 4, there is shown schematically a fluid pressure control system for an actuator of the character aforedescribed. It is to be understood that the control system herein disclosed is only exemplary. As is shown in Fig. 4, the fluid pressure control system includes a pressure supply conduit 100, which may be connected to any suitable source of fluid under pressure, not shown. The system also includes a drain conduit 102. The pressure supply conduit 100 is shown in Fig. 4 as passing through servo chamber 70 of the toothed type brake releasing means. Thus, when the pressure potential in the supply conduit 100 is of a predetermined magnitude, the toothed type brake will be released inasmuch as piston 72 will be moved to the right so that piston rod 74 will expand brake band 60. The brake band 60 is shown as including a serrated portion 62, and housing stop 78 and the spring 76 of the brake assembly are shown. The servo chamber 70 is also shown with the drain port 84. The pressure supply conduit 100 also has connection with an inlet port 104 of a manually operable, four-way selector valve 106. The selector valve 106 includes a valve casing 108 having drain ports 110 and 112, which are connected with drain conduit 102. The casing 108 also includes outlet ports 114 and 116, which are connected to opposite ends of a shuttle valve casing 118 by conduits. A four-land plunger 120 is mounted within the valve casing 108 for reciprocal movement, the plunger 120 having an extending rod portion 122, which may be manually actuated. The shuttle valve casing 118 includes a pressure responsive shuttle valve element 124, the conduits from the outlet ports 114 and 116 passing through the casing and connecting with the extend actuator port 17 and the retract actuator port 18. The actuator 10 is diagrammatically shown as including a cylinder within which a piston, having a longitudinally extending rod portion, is disposed for reciprocal movement. The shuttle valve casing 118 has a medially disposed port 126 having connection with a conduit 128, which connects with port 83 of the servo chamber 71. Servo chamber 71 forms part of the brake releasing means for the friction brake assembly, heretofore described, which includes the piston 73 having a rod portion 75, with friction brake band 61, the stop 79 and the spring 77.

Thus, in accordance with the fluid pressure control system disclosed in Fig. 4, the friction brake band constituting a portion of the dual locking means is not released until fluid under pressure is applied to either of the actuator chambers 19 or 20, by manual movement of the selector valve plunger 120.

*Operation*

Fluid pressure operation of the actuator in accordance with the system disclosed in Fig. 4 is as follows: When the selector valve plunger is moved to the left, as viewed in Fig. 4, such that inlet port 104 is in communication with outlet port 114, and outlet port 116 is in communication with drain port 112, the sequence of events is as follows: If the pressure in supply conduit 100 is of a predetermined potential, the toothed brake means will have been released by reason of piston 72 expanding brake band 60. However, if the pressure potential in supply conduit 100 is not of the requisite pressure potential, the toothed brake means will not be released and movement of the actuator piston 13 will be positively restrained.

Assuming that the pressure potential in supply conduit 100 is sufficient to release the toothed brake, or locking means, application of pressure to extend actuator chamber 19 will move the shuttle valve element 124 to the right, as viewed in Fig. 4, in which instance, the pressure potential existent in supply conduit 100 will be communicated through conduit 128 to the servo chamber 71 of the friction brake releasing means. Thus, the friction brake band 61 will be expanded, thereby freeing the reaction member, or ring gear 52, of the planetary gear set for rotation. As fluid under pressure is being supplied to the extend actuator chamber 19 and the retract actuator chamber 20 is connected to drain through selector valve ports 116 and 112 of Fig. 4, actuator piston 13 will move to the right, as viewed in Figs. 1 and 4, which movement will effect relative rotation between the nut 21 and the screw shaft 22. As screw shaft 22 is the rotatably supported member of the ball-screw and nut assembly, lineal movement of the piston 13 will effect rotation of the screw shaft 22, which is permitted through the gear train comprising gears 32, 35 and 38, since the locking means associated with the ring gear 52 of the planetary gear set 45 are released. Thus, lineal movement of the piston 13 will effect rotation of the screw shaft 22 and rotation of the planet carrier 46 about the then fixed sun gear 51.

When the desired extended actuator movement has been realized, the operator returns the selector valve plunger 120 to the position shown in Fig. 4, whereupon the two intermediate lands of the plunger 120 connect the outlet ports 114 and 116 with drain conduit 102. Instantaneously, thereafter, the pressure potential existent in conduit 128 will decrease to a value wherein the inherent resiliency of the brake band 61 will move the piston 73 to the right, as viewed in Fig. 4, thereby causing the brake band 61 to frictionally engage the ring gear 52 and restrain rotation of the actuator screw shaft 22.

It is to be understood that should it be desired, the servo chamber 70 of the dog type lock releasing means could also be connected with the shuttle valve port 126 instead of being connected in the pressure supply conduit 100. If so connected, actuation of the selector valve would release both of the dual locking means substantially simultaneously. However, since the selector valve in the neutral position, connects conduit 128 with drain conduit 102 so that the friction brake will be operative, the system disclosed in Fig. 4 is adequate. In the event that the pressure supply system fails, both locking means will be engaged with the friction branke band being instantaneously operable to restrain rotation of screw shaft 22, with the toothed brake band preventing slippage, or creepage, of the reaction member 52 under sustained vibration.

If the fluid pressure system for operating the actuator should fail, or if the operator desires to effect movement of actuator piston 13 independently of the fluid pressure system, this may be accomplished by energizing the electric motor constituting the auxiliary motivating means. When the electric motor is energized, the electromagnetic clutch is actuated so that rotation is imparted to the sun gear 51. At this time, the ring gear 52 is restrained from rotation by either or both of the dual locking means and, accordingly, rotation of the sun gear will effect rotation of the planet carrier 46 through the planet gears 50. Rotation of the planet carrier 46 will be imparted to the screw shaft 22 through shaft 39 and the gear train comprising gears 38, 35 and 32. Accordingly, relative rotation will occur between the screw shaft 22 and the nut 21, which will effect linear movement of the piston 13, flow of fluid from the actuator chamber being permitted by reason of ports 114 and 116 being exposed to drain when the valve 106 is in the neutral position, as shown in Fig. 4. As reciprocal movement of the actuator piston 13 is contemplated by the electric motor, a reversible electric motor is conveniently used to effect rotation of the screw shaft 22 in either direction. However, it is to be understood that a unidirectional electric motor could be used if reversible gearing means were employed.

With an actuator of the present design, it is readily apparent that the dual locking means will positively prevent movement of the actuator piston under sustained vibration such as encountered in an aircraft. Moreover, by employing the dual locking means, it is apparent that in the absence of fluid pressure actuation through the cylinder, and while the electric motor is deenergized, movements of the piston 13 relative to the cylinder 10 are prevented by the engaged locking means. When fluid pressure is employed as the motivating means for effecting piston movement in either direction, the locking means must be released to permit rotation of the ring gear of the planetary gear set, which, in turn, permits rotation of the screw shaft relative to the piston and nut assembly. However, when the electric motor is used as the motivating means, at least one of the dual locking means associated with the ring gear of the planetary gear set must be in the locked, or engaged, condition to facilitate rotation of the screw shaft 22 relative to the nut and piston assembly through the sun gear of the planetary gear set. It is further apparent that reciprocal movement of the piston within the actuator cylinder can only be effected by relative rotary movement between the nut and screw shaft.

While the embodiments of the present invention as herein disclosed, constitute preferred forms, it is to be understood that other forms might be adopted.

What is claimed is as follows:

1. A fluid pressure operated actuator including in combination, a cylinder, a lineally movable piston disposed in said cylinder capable of fluid pressure actuation in either direction, and locking means operatively connected with said piston for normally preventing movement thereof, said locking means comprising a pair of tandem arranged, independently operable locking means, each locking means being capable of preventing movement of the piston in both directions when engaged, and fluid pressure actuated means operatively associated with each of said pair of locking means for releasing the same.

2. A fluid pressure operated actuator including in combination, a cylinder, a reciprocable piston disposed in said cylinder capable of fluid pressure actuation in either direction, dual locking means operatively associated with said piston for preventing movement of said piston when no fluid pressure is exerted thereon, each locking means being capable of preventing movement of said piston in both directions when engaged, and independent fluid pressure operated means for releasing each of said dual locking means.

3. A fluid pressure operated actuator including in combination, a cylinder, a lineally movable piston in said cylinder capable of fluid pressure actuation in either direction, a first member disposed in said cylinder and operatively connected to said piston so as to move lineally therewith, a second member operatively engaging said first member, one of said members being supported for rotation within said cylinder, the construction and arrangement being such that relative rotation will occur between said first and second members upon linear movement of said piston, and releasable dual locking means operatively associated with said one member for normally preventing rotation thereof, thereby preventing linear movement of said piston when no fluid pressure is exerted thereon, each locking means being capable of preventing movement of said piston in both directions when engaged.

4. The combination set forth in claim 3 wherein the releasable dual locking means comprise a pair of tandem arranged brake bands operatively associated with the said one rotatable member for normally restraining rotation thereof.

5. The combination set forth in claim 4 wherein independent means operatively associated with each of said brake bands are provided for releasing the same to permit rotation of said one member and consequent movement of said piston upon application of fluid pressure to said cylinder.

6. A control system for fluid pressure operated actuator having a cylinder, a reciprocative piston in said cylinder capable of fluid pressure actuation in either direction, dual locking means operatively associated with said piston for normally preventing movement thereof and independent means for releasing each of the locking means constituting the dual locking means, including in combination, a pressure supply conduit, a drain conduit, first servo actuated mechanism operatively associated with one of said dual locking means for releasing the same upon the attainment of a predetermined pressure potential in said pressure supply conduit, a control valve having connection with the supply and drain conduits and the actuator cylinder on opposite sides of said piston, and a second servo mechanism operatively associated with the other of said dual locking means for releasing the same upon application of fluid pressure from said supply conduit to said actuator cylinder on either side of said piston whereby both locking means will be released to permit movement of said piston upon the application of fluid pressure to said cylinder.

7. A dual drive actuator including in combination, a cylinder, a reciprocative piston disposed in said cylinder, releasable dual locking means arranged in tandem and operatively connected with said piston for normally preventing movement thereof, primary motivating means for effecting movements of said piston in either direction, and auxiliary driving means for effecting movement of said piston in either direction in lieu of actuation by said primary motivating means, said auxiliary driving means only being operable to effect movement of said piston when at least one of said dual locking means is in the locked condition.

8. A dual drive actuator including in combination, a cylinder, a piston in said cylinder capable of fluid pressure actuation in either direction, releasable dual locking means operatively associated with said piston for preventing movement of said piston when no fluid pressure is exerted thereon, and auxiliary driving means operatively connected to said piston for effecting movement thereof in either direction with the dual locking means in the locked condition.

9. A dual drive actuator including in combination, a cylinder, a piston in said cylinder capable of fluid pressure actuation in either direction, locking means operatively associated with said piston for preventing movement of said piston when no fluid pressure is exerted thereon, said locking means comprising a pair of independently releasable locking means, and auxiliary driving means operatively connected to said piston for effecting movement thereof in either direction with at least one of said pair of locking means in the locked condition.

10. A dual drive actuator including in combination, a cylinder, a piston in said cylinder capable of fluid pressure actuation in either direction, a pair of tandem arranged locking means operatively associated with said piston for preventing movement of said piston when no fluid pressure is exerted thereon, independent means for releasing each of said pair of locking means, and auxiliary driving means operatively connected to said piston for effecting movement thereof in either direction with said pair of locking means in the locked condition.

11. A dual drive actuator including in combination, a cylinder, a piston in said cylinder capable of fluid pressure actuation in either direction, a pair of tandem arranged locking means operatively associated with said piston, at lease one of said pair of locking means preventing movement of said piston when no fluid pressure is exerted thereon, means for releasing at least one of said locking means upon application of fluid pressure to said cylinder to permit movement of said piston, and auxiliary driving means operatively connected to said piston for effecting movement thereof in either direction with at least one of said pair of locking means in the locked condition.

12. A dual drive actuator including in combination, a cylinder, a lineally movable piston in said cylinder capable of fluid pressure actuation in either direction, a first member disposed in said cylinder and operatively connected to said piston so as to move lineally therewith, a second member operatively engaging said first member, one of said members being journaled for rotation in said cylinder, the construction and arrangement being such that relative rotation will occur between said members upon linear movement of said piston, dual locking means operatively associated with said piston for normally preventing linear movement thereof, means for releasing said dual locking means to permit movement of said piston upon the application of fluid pressure to said cylinder, and auxiliary driving means operatively connected to said piston through said members for effecting linear movement of said piston in either direction, said auxiliary means, when inactive, maintaining said dual locking means operative and, when active, operative to rotate said one member with the dual locking means in the locked condition.

13. The combination set forth in claim 12 wherein said one rotatable member is operatively connected to a planet carrier of a planetary gear set, said planetary gear set including, a sun gear normally restrained against rotation by the inactive auxiliary driving means, a plurality of planet gears carried by said planet carrier, and a ring gear, and wherein said dual locking means are operatively associated with said ring gear for preventing rotation thereof in the obsence of fluid pressure application to said cylinder.

14. A dual drive actuator including in combination, a cylinder, a reciprocable piston disposed in said cylinder capable of fluid pressure actuation in either direction, a rotatable member disposed in said cylinder and operatively connected to said piston so as to rotate in response to movement of said piston, releasable locking means operatively associated with said member and normally operative to prevent rotation of said member and consequently prevent reciprocal movement of said piston in the absence of fluid pressure application to said cylinder, and auxiliary driving means operatively associated with said locking means for effecting rotation of said member in either direction and consequently effecting reciprocable movement of said piston in lieu of fluid pressure application to the cylinder, said locking means including a planetary gear set, the planet carrier of which is connected to said rotatable member, the sun gear of which is connected to said auxiliary driving means, and the ring gear of which is restrained against rotation in the absence of fluid pressure application to said cylinder, said auxiliary means, when inactive, maintaining the locking means operative by restraining rotation of the sun gear, and when active, operative to rotate the sun gear and the said rotatable member with the ring rear restrained against rotation.

15. A dual drive actuator including in combination, a cylinder, a lineally movable piston in said cylinder capable of fluid pressure actuation in either direction, a first member disposed in said cylinder and operatively connected to said piston so as to move lineally therewith, a second member operatively engaging said first member, one of said members being journaled for rotation in said cylinder, the construction and arrangement being such that relative rotation will occur between said members upon linear movement of said piston, a pair of tandem arranged locking means operatively associated with said piston for normally preventing linear movement thereof, independent means operatively associated with each of said pair of locking means for releasing the same to permit movement of said piston by the application of fluid pressure to said cylinder, and auxiliary driving means operatively connected to said piston through said members for effecting linear movement of said piston in either direction, said auxiliary means, when inactive, maintaining said pair of locking means operative and, when active, operative to rotate said one member with at least one of said pair of locking means in the locked condition.

16. The combination set forth in claim 15 wherein the independent means for releasing said pair of locking means include, a pair of lock release cylinders and a pair of lock release pistons disposed in said cylinders, each of said pistons being operatively associated with one of said pair of locking means and capable of movement under the urge of fluid pressure to release the same.

17. A dual drive actuator including in combination, a cylinder having a lineally movable piston disposed therein capable of fluid pressure actuation in either direction, releasable dual locking means operatively associated with said piston for preventing movement of said piston when no fluid pressure is exerted thereon, an auxiliary driving means operatively connected to said piston for effecting linear movement thereof in either direction in lieu of fluid pressure actuation, the operative connection between piston and said auxiliary means including a hollow member disposed in said cylinder and constrained for linear movement with said piston, the said dual locking means in the locked condition, and a rotatable member disposed in said cylinder extending longitudinally through and operatively engaging said hollow member whereby relative rotation will occur between said members upon linear movement of said piston, said driving means, when inactive, maintaining said dual locking means operative to prevent piston movement, and, when active, operative to rotate said rotatable member.

18. A dual drive actuator including in combination, a cylinder, a reciprocable piston in said cylinder capable of fluid pressure actuation in both directions, a pair of tandem arranged, releasable locking means operatively associated with said piston for normally preventing movement of said piston, and auxiliary driving means operatively connected to said piston for effecting movement thereof in either direction, said auxiliary driving means only being operable to effect movement of said piston when at least one of said pair of locking means is in the locked condition.

19. An actuator assembly including in combination, a cylinder, a reciprocable piston in said cylinder, a member rotatably journalled in said cylinder and operatively connected to said piston such that piston movement is dependent upon rotation of said member, and releasable locking means operatively associated with said member for restraining rotation of said member, and, consequently, preventing movement of said piston when the actuator is inactive, said locking means comprising a pair of tandem arranged, independently operable locking devices.

20. An actuator assembly including in combination, a cylinder, a reciprocable piston disposed in said cylinder, a member rotatably journalled in said cylinder and threadedly engaging said piston so that movement of said piston is dependent upon rotation of said member, a pair of tandem arranged locking means operatively associated with said member for restraining rotation of said member and, consequently, preventing movement of said piston when the actuator is inactive, and independent means for releasing each of said locking means whereby rotation of said member will be restrained, and hence movement of said piston will be prevented when either of said locking means is in the locked condition, rotation of said member and consequent movement of said piston only being permitted when both of said locking means are released.

References Cited in the file of this patent

UNITED STATES PATENTS

| | | |
|---|---|---|
| 679,421 | Halsey | July 30, 1901 |
| 1,140,328 | Mellin | May 18, 1915 |
| 1,479,440 | Abele | Jan. 1, 1924 |
| 1,503,280 | Osbourne | July 29, 1924 |
| 2,119,419 | Clench | May 31, 1938 |
| 2,523,053 | Obrist | Sept. 19, 1950 |
| 2,638,736 | Feeney | May 19, 1953 |
| 2,660,028 | Geyer | Nov. 24, 1953 |

FOREIGN PATENTS

| | | |
|---|---|---|
| 61,867 | Netherlands | Oct. 15, 1948 |